No. 771,041. PATENTED SEPT. 27, 1904.
W. H. BUTLER.
DOUGH MIXER.
APPLICATION FILED MAY 14, 1904.
NO MODEL.

Witnesses
R. A. Boswell.
George M. Anderson.

Inventor,
W. H. Butler,
By E. W. Anderson
Attorney

No. 771,041. Patented September 27, 1904.

UNITED STATES PATENT OFFICE.

WILLIAM H. BUTLER, OF MACON, MISSOURI.

DOUGH-MIXER.

SPECIFICATION forming part of Letters Patent No. 771,041, dated September 27, 1904.

Application filed May 14, 1904. Serial No. 207,938. (No model.)

*To all whom it may concern:*

Be it known that I, WILLIAM H. BUTLER, a citizen of the United States, and a resident of Macon, in the county of Macon and State of Missouri, have made a certain new and useful Invention in Dough-Mixers; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1:
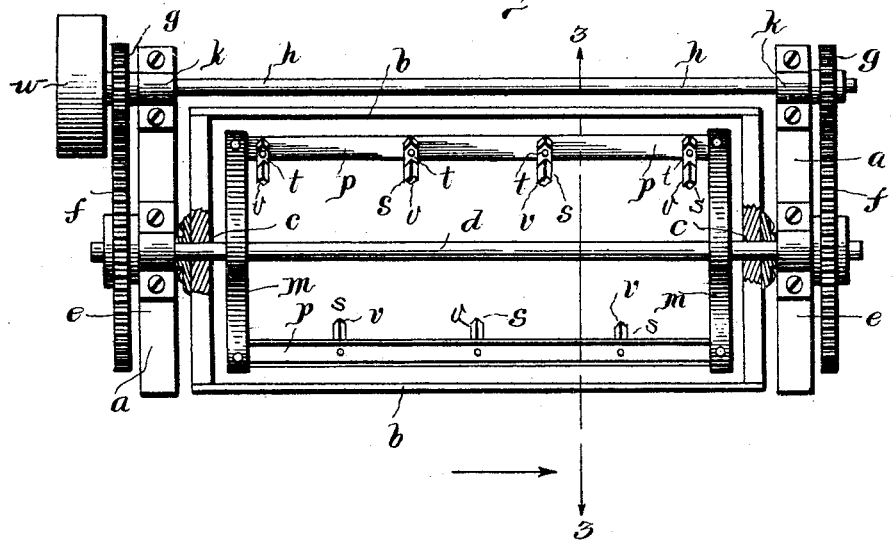
Figures 2, 3:
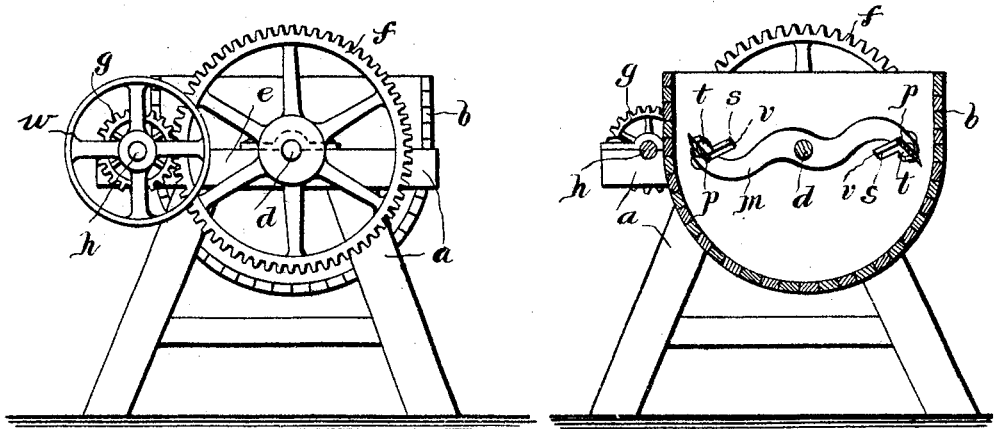
Figure 4:
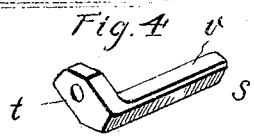

Figure 1 is a plan view of the invention. Fig. 2 is an end view of the same. Fig. 3 is a section on the line 3 3, Fig. 1. Fig. 4 is a perspective view of one of the mixer-fingers.

The object of the invention is to provide a simple and efficient machine for mixing dough; and the invention consists in the novel construction and combination of parts as hereinafter set forth.

In the accompanying drawings, illustrating the invention, the letter *a* designates framework, and *b* a mixing-trough strongly secured thereto. This trough is of general cylindrical form, the upper part being open. In the center of each end of the trough is provided a bearing *c* for the passage of the end of a shaft *d*, and this bearing is continued outside of the trough on the horizontal cross-bars *e* of the frame. In this manner the bearings are made solid and firm.

At each end of the shaft *d* is provided a large gear-wheel *f*, which is rigidly attached to the shaft and engages a smaller gear-wheel *g* on the power-shaft *h*, which is provided with bearings *k* on the horizontal bars *e* of the frame and extends along outside the trough at its back.

Inside the trough the shaft *d* is provided with the arms *m*, one near each end, and the ends of these cross-arms carry the longitudinal bars *p*, each of which is parallel to and diametrically opposite to the other and provided with series of hook-shaped mixer-fingers *s*, the fingers on one bar being opposite the middle portions of the intervals between the fingers on the opposite bar or in such break-joint relation that the action of one set of fingers on the mass of dough will force its portions toward the paths of the other set of fingers for their action as they come around in their turn. The cross-arms *m* are curved and have their widest extent in the vertical plane and are thin from side to side, so that they will pass more readily through the mass of dough at its ends. They may be made slightly oblique in order to move the dough somewhat from the ends of the trough toward the middle portion. The longitudinal bars *p* are also thin, being usually made of plate metal, and they have their planes slightly oblique or inclined outward and downward, tending to gather the dough inward or away from the wall of the trough and mass it for the action of the angular hook-fingers which are turned inward. Each of these fingers consists of a shank portion *t*, attached rigidly to the bar *p* and extending in rear of the same relatively to its direction of movement, and a hook portion *v*, extending at a right angle, or nearly so, inward from the end of said shank portion. These fingers are rounded and are designed in passing through the mass of dough to engage the same, pulling its portions in different directions in such wise as to change the relative positions of the particles of the mass and mix it in an efficient manner.

The power-shaft is provided with a belt-pulley *w* and by means of its gearing engages the large gear-wheels at the ends of the mixer-shaft, so as to strengthen its action and prevent twisting, the mass of dough being somewhat tenacious in its consistency. The trough *b* hangs on the center shaft *d*. The center of gravity of the trough being below said shaft the trough remains in proper upright position, but is at the same time readily turned upon said shaft for dumping purposes. The action of the longitudinal bars *p* is also to gather a thin layer of dough the full length of the machine and spread such layer over the mass of dough, thereby gathering the air into the whole mass of dough underneath such layer.

Having described this invention, what I claim, and desire to secure by Letters Patent, is—

A dough-mixer consisting of the frame and cylindrical trough secured thereto, the power-shaft and gear-wheels, the central mixer-shaft and gear-wheels, the cross-arms, the longitudinal inclined plate-bars, diametrically opposite and parallel to each other, and the series of angular hook-shaped mixer-fingers in rear of and attached to said bars, and having their hook ends directed inward, substantially as specified.

In testimony whereof I affix my signature in presence of two witnesses.

WILLIAM H. BUTLER.

Witnesses:
J. G. YUTZ,
B. McDONALD.